United States Patent
Yoon

(10) Patent No.: US 7,565,154 B2
(45) Date of Patent: Jul. 21, 2009

(54) POSITION INFORMATION TRANSMITTING METHOD OF MOBILE COMMUNICATION TERMINAL

(75) Inventor: Hyoung-Sik Yoon, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 405 days.

(21) Appl. No.: 10/393,228

(22) Filed: Mar. 20, 2003

(65) Prior Publication Data

US 2004/0203920 A1 Oct. 14, 2004

(30) Foreign Application Priority Data

Apr. 15, 2002 (KR) ............... 2002-20445

(51) Int. Cl.
*H04W 24/00* (2006.01)

(52) U.S. Cl. .............. 455/456.1; 455/404.2; 455/414.2; 455/456.2; 455/456.5; 455/456.6; 455/457; 455/466; 379/201.08

(58) Field of Classification Search ... 455/456.2–456.7, 455/466, 237.1, 238.1, 239.1, 404, 456.1; 342/443, 444, 445, 446, 450, 454, 455, 456, 342/457, 357.1

See application file for complete search history.

(56) References Cited

U.S. PATENT DOCUMENTS 4,172,969 A * 10/1979 Levine et al. ................. 379/70
5,699,255 A * 12/1997 Ellis et al. ..................... 701/212
5,835,907 A * 11/1998 Newman ........................ 707/10
6,131,067 A * 10/2000 Girerd et al. .................. 701/213
6,226,367 B1 * 5/2001 Smith et al. ............. 379/142.04
6,415,156 B1 * 7/2002 Stadelmann ................ 455/466
6,505,048 B1 * 1/2003 Moles et al. ............. 455/456.1
6,563,459 B2 * 5/2003 Takenaga ................. 342/357.1
6,716,101 B1 * 4/2004 Meadows et al. ......... 455/456.1
2001/0050631 A1 * 12/2001 Takenaga ............... 342/357.13
2002/0077075 A1 * 6/2002 Ikonen et al. ................ 455/404
2003/0016804 A1 * 1/2003 Sheha et al. ............ 379/201.06
2003/0083080 A1 * 5/2003 Fournier et al. ............. 455/466

FOREIGN PATENT DOCUMENTS

KR 100277672 B1 10/2000
KR 20010103815 A 11/2001

* cited by examiner

*Primary Examiner*—Vincent P Harper
*Assistant Examiner*—Mazda Sabouri
(74) *Attorney, Agent, or Firm*—Lee, Hong, Degerman, Kang & Waimey

(57) ABSTRACT

A method for transmitting position information of a mobile communication terminal is provided. The method comprises inputting a telephone number of a receiving terminal, selecting to transmit position information, calculating position information of the mobile communication terminal, and transmitting a voice communication with a signal providing position information of the mobile communication terminal. If desired, a user can input a short message service (SMS) text message prior to transmitting or prior to selecting to transmit position information instead of voice communication. Position information of the terminal is derived from the global positioning system (GPS).

10 Claims, 3 Drawing Sheets

POSITION INFORMATION TRANSMITTING METHOD OF MOBILE COMMUNICATION TERMINAL

CROSS REFERENCE TO RELATED APPLICATION

Pursuant to 35 U.S.C. § 119(a), this application claims the benefit of earlier filing date and right of priority to the Korean Patent Application No. 2002-20445, filed on Apr. 15, 2002, entitled "Position Information Transmitting Method of Mobile Communication Terminal," the content of which is hereby incorporated by reference in its entirety.

BACKGROUND OF THE INVENTION

1. Field of the Invention

The present invention relates to a mobile terminal in a mobile communication system, and more particularly, to a position information transmitting method of a mobile terminal.

2. Description of Background Art

In a mobile communication system, the position information of a user of a mobile terminal is generally determined by using one or more of the following methods: time of arrival (TOA) method; angle of arrival (AOA) method; and time difference of arrival (TDOA) method.

The TOA method requires the use of a plurality of base stations situated around a mobile terminal that measure the time of arrival of a transmission signal from the mobile terminal to calculate a distance between the base stations and the mobile terminal. Using the calculated distances as radii, virtual circles are drawn by the base stations and the point of intersection among the base stations' virtual circles is deemed as the position of the mobile terminal.

The AOA method also requires the use of a plurality of base stations situated around a mobile terminal. The base stations in this method measure the direction in which a transmission signal is received and draw a virtual line in the measured direction. The point of intersection of the base stations' virtual direction lines signifies the position of the mobile terminal.

The TDOA method requires the use of a plurality of base stations situated around a mobile terminal. The base stations in this method draw virtual hyperbolas by using the time difference of arrival between the transmission signal receptions at the base stations. A common intersection of the hyperbolic curves indicates position of the mobile terminal.

With respect to the three aforementioned methods, information regarding the position of a mobile terminal is limited to or contained within the base stations. A mobile terminal user cannot determine- or provide calculated or exact position information to others unless one or more base stations transmit an information signal providing position information. A mobile terminal user must voice or type via short message service (SMS) the description of the terminal's physical location. Therefore, a solution is required for a mobile terminal user to have the terminal's position information available for personal knowledge and/or transmission to others.

SUMMARY OF THE INVENTION

The present invention is directed to a method for transmitting position information of a mobile terminal. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

A method for transmitting position information of a mobile terminal, according to one aspect of the invention, comprises inputting a telephone number of a receiving terminal into the mobile communication terminal; selecting to transmit position information; calculating position information of the mobile communication terminal; and transmitting a voice communication with a signal providing position information of the mobile communication terminal.

According to one aspect of this embodiment, the calculated position information, which may be GPS information, is converted into a more user-friendly location identification and then transmitted as the signal providing position information.

In another embodiment of the invention, a method for transmitting position information of a mobile terminal comprises inputting a telephone number of a receiving terminal into the mobile communication terminal; selecting to transmit position information; inputting a short message service (SMS) text message; calculating position information of the mobile communication terminal; and transmitting a SMS message with a signal providing position information of the mobile communication terminal.

According to one aspect of this embodiment, the calculated position information, which may be GPS information, is converted into a more user-friendly location identification and then transmitted as the signal providing position information.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

Features, elements, and aspects of the invention that are referenced by the same numerals in different figures represent the same, equivalent, or similar features, elements, or aspects in accordance with one or more embodiments.

Reference will now be made in detail to one or more embodiments of the invention, examples of which are illustrated in the accompanying drawings.

DETAILED DESCRIPTION OF THE PREFERRED EMBODIMENTS

Figure 1:
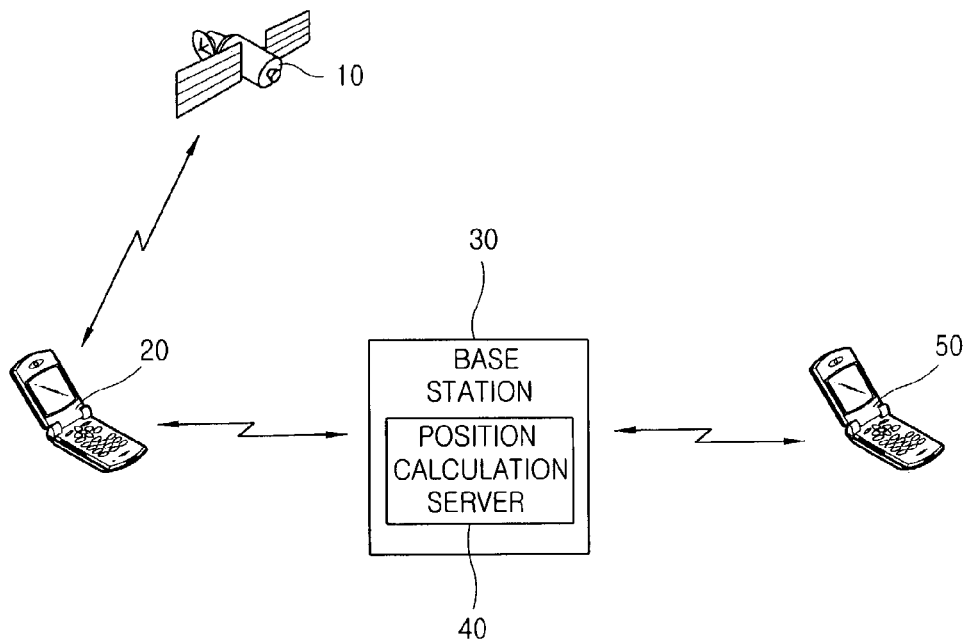
FIG. 1 illustrates a schematic view showing a position information transmitting device of a mobile communication terminal in accordance with one or more embodiments of the present invention.

FIG. 1 illustrates a schematic view showing a position information transmitting device of a mobile communication terminal according to one or more embodiments of the present invention. A global positioning system (GPS) satellite 10 receives and transmits GPS position information with an originating mobile communication terminal 20, which includes a GPS receiver. In the transmission of a signal by the originating terminal 20 to a base station 30, a position calculation server 40 within the base station 30 calculates the position of the originating terminal 20 and relays the signal and the position information to the receiving terminal 50, which also includes a GPS receiver.

Hereinafter, operation of the present invention will be described with reference to FIGS. 2-4.

Figure 2:
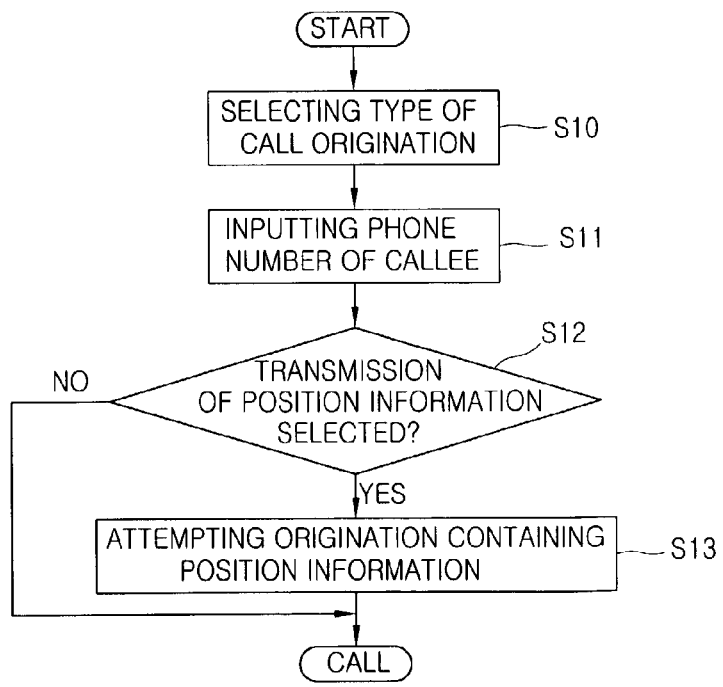
FIG. 2 illustrates a flow chart of a position information transmitting device of a mobile communication terminal in accordance with one or more embodiments of the present invention.

With reference to FIG. 2, a caller selects the type of transmission from the originating terminal, such as voice or SMS (step S10). After selection, the caller inputs a telephone number corresponding to the receiving terminal 50 and selects whether position is to be transmitted (steps S11, S12). If the caller wishes to transmit position information, the originating terminal 20 calculates its current position using the GPS receiver installed within the terminal 20. Otherwise, a call is made without transmitting position information. A call is then attempted containing corresponding position information (step S13). The receiving terminal user can then confirm the originating terminal's telephone number and position information, which, for example, would be shown on the display screen of the receiving terminal 50.

Figure 3:
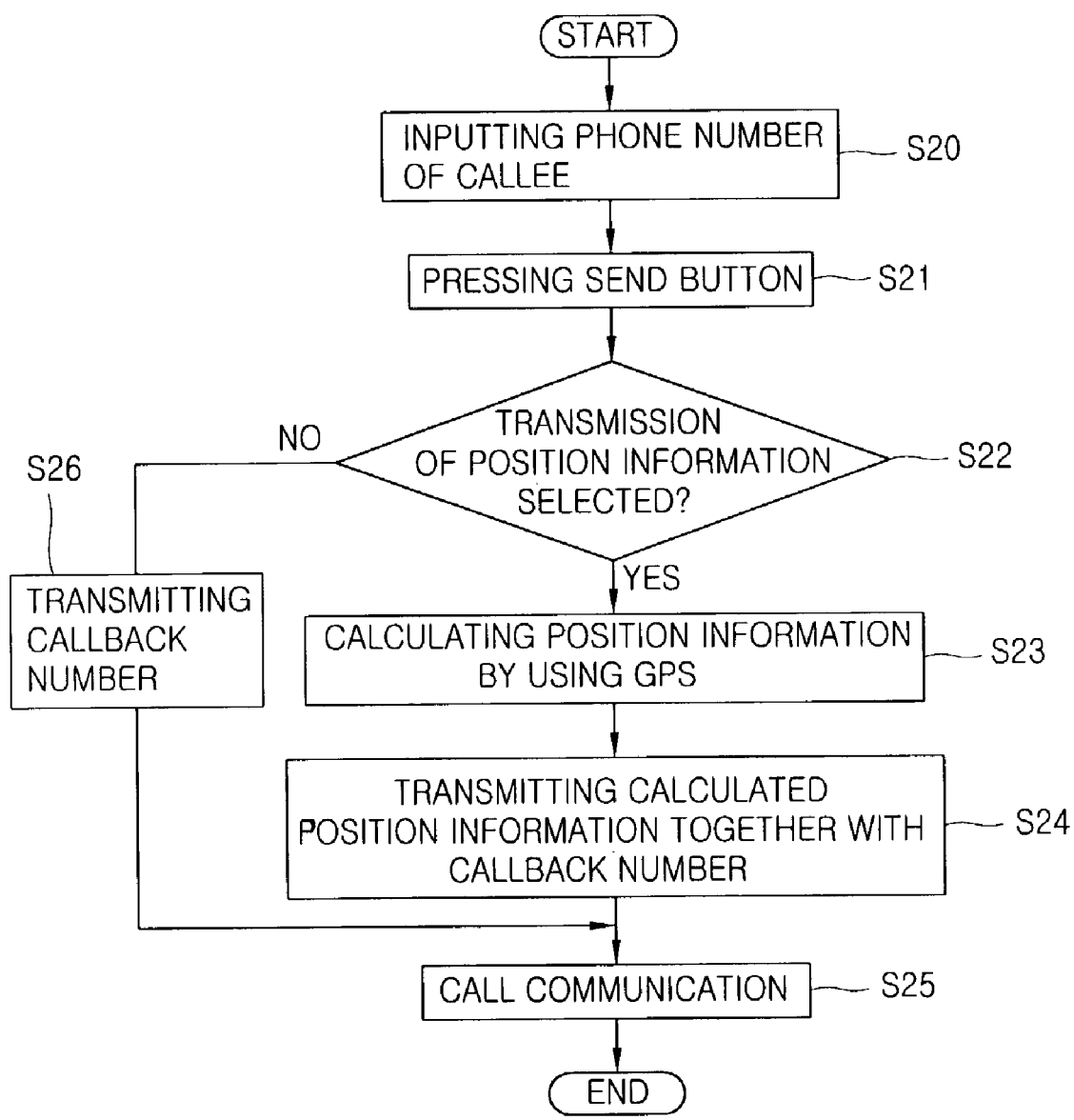
FIG. 3 illustrates a flow chart for transmitting position information of a caller for voice transmission in accordance with one or more embodiments of the present invention.

FIG. 3 illustrates the process described above in further detail. In the case of a voice transmission, a caller first inputs into the originating terminal 20 a telephone number of the receiving terminal 50 and presses a button to transmit, such as a "SEND" button (steps S20, S21). The caller then selects whether to transmit position information (step S22). If the caller opts to provide and transmit his position information, the caller then may press one or more buttons on the originating terminal's keypad to receive, via the GPS receiver in the originating terminal 20, signals from one or more GPS satellites 10 and calculate GPS information (step S23). Upon completion of the calculation, the originating terminal 20 attempts to transmit position information together with a callback number (step S24). If the caller elects not to provide position information, step S23 is not performed and the originating terminal 20 attempts only to transmit the callback number to the receiving terminal 50 (step S26). Thereafter, communication between the originating 20 and receiving terminals 50 is performed (step S25).

During step S23, GPS information received by the GPS receiver by the GPS system satellite 10 is transmitted to the position calculation server 40 provided in the base station 30 by the originating terminal 20. The position calculation server 40 converts the GPS information into position information easily identifiable by users by using geographical information (GIS) data. The base station 30 then transmits voice, position and caller identification information accordingly.

Figure 4:
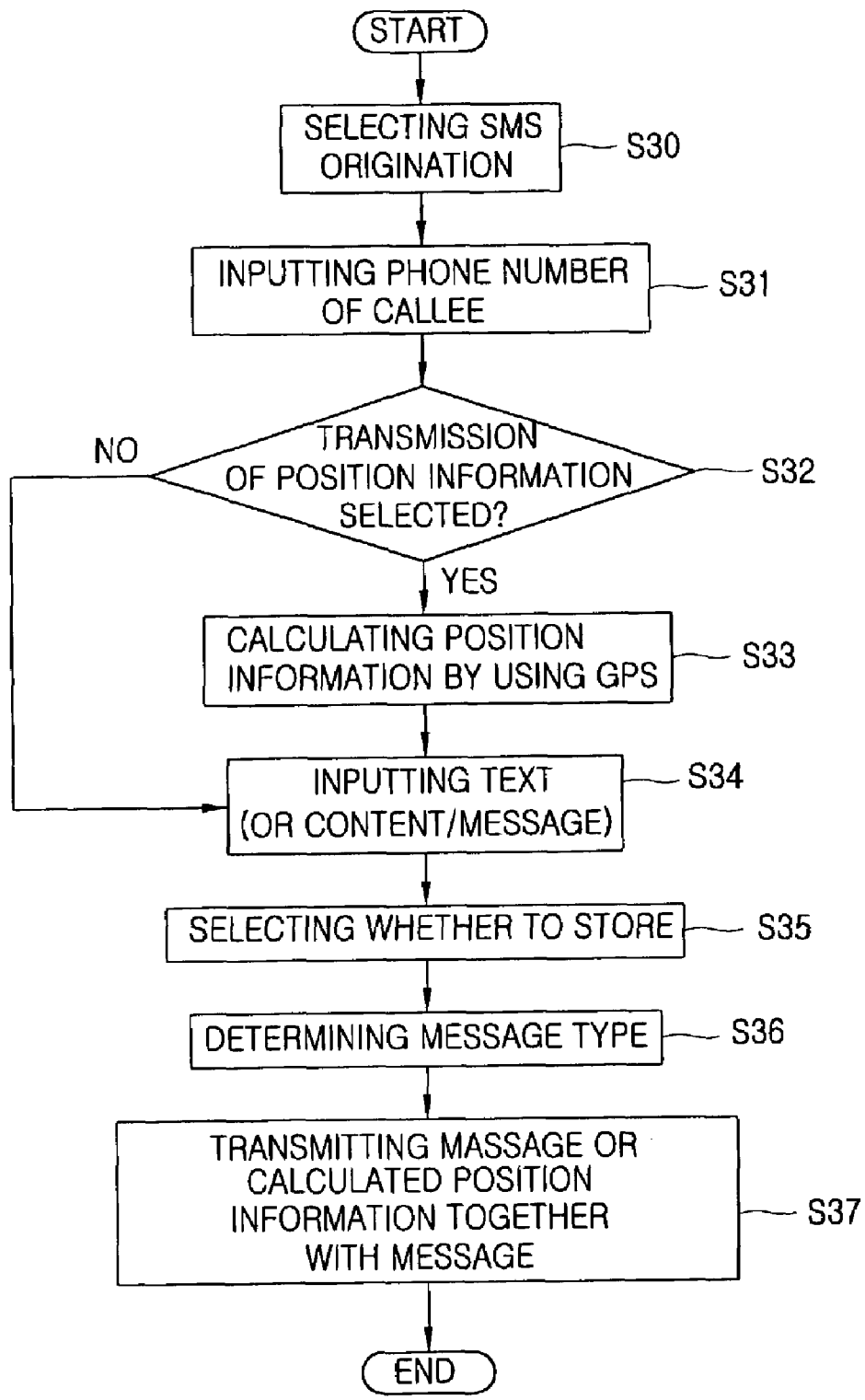
FIG. 4 illustrates a flow chart for transmitting position information of a caller for SMS transmission in accordance with one or more embodiments of the present invention.

FIG. 4 illustrates the above-described process but with respect to SMS transmission. The caller selects to transmit an SMS message using the originating terminal 20 and dials the telephone number of the receiving terminal 50 (steps S30, S31). The caller then elects to transmit position information (step S32). If so, the caller then presses one or more buttons on the originating terminal's keypad to receive, via the GPS receiver in the originating terminal 20, signals from one or more GPS satellites 10 and calculate GPS information (step S33). Upon completion of the calculation of the GPS information, the caller inputs the desired content of the SMS message (step S34). Alternatively, the caller may input the content of the SMS message prior to electing to send position information. The caller may also decide whether to store the message as well as decide the message type (steps S36, S37). The caller then presses one or more buttons on the keypad of the originating terminal 20, such as the "SEND" button, to attempt to transmit the SMS message, position information, and the originating terminal's telephone number (step S37). If the caller elects not to provide position information in step S32, the originating terminal 20 performs the steps S34, S35 and S36 and then attempts to transmit the SMS message (step S37).

Similar to voice transmission described above in reference to FIG. 3, during step S33, GPS information received by the GPS receiver by the GPS system satellite 10 is transmitted to the position calculation server 40 provided in the base station 30 by the originating terminal 20. The position calculation server 40 converts the GPS information into position information easily identifiable by users by using geographical information (GIS) data. The base station 30 then transmits the SMS message, and position and caller identification information accordingly.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for transmitting position information of a mobile communication terminal, the method comprising:

providing a user of a mobile communication terminal with a choice to transmit a phone number assigned to the mobile communication terminal, or a combination of both a position and the phone number of the mobile communication terminal to a receiving terminal by way of a first base station in a mobile communication network, wherein selecting whether to transmit one or a combination of both the position and the phone number is performed based on user interaction with the mobile communication terminal and independent from any requests submitted from the first base station to the mobile communication terminal for the position information;

transmitting the position information from the mobile communication terminal to the first base station such that the position information is not received by the receiving terminal prior to the position information being converted to user-identifiable location data, wherein the first base station independent from any remote server calculates position of the mobile communication terminal based on geographic information data stored in the base station; and establishing a communication session between the mobile communication terminal and the receiving terminal via the base station, wherein the communication session comprises at least one of a voice session or a data session, wherein the calculation performed in the first base station converts the position information transmitted from the mobile communication terminal into user-identifiable location data, wherein the user-identifiable location data is transmitted from the first base station to the receiving terminal to convey position of the mobile communication terminal to a user of the receiving terminal.

2. The method of claim 1, further comprising: transmitting the telephone number of the mobile communication terminal.

3. The method of claim 1, wherein the calculated position information is global positioning system (GPS) information.

4. The method of claim 1, further comprising:
receiving transmission signals from three or more GPS satellites; and
calculating distances between the mobile communication terminal and the three or more GPS satellites; and
triangulating the position of the mobile communication terminal from the calculated distances.

5. The method of claim 1 further comprising:
transmitting a SMS message with a signal providing position information of the mobile communication terminal.

6. A mobile communication terminal comprising:
a GPS receiver for triangulating accurate position information for the mobile communication terminal; and
a transmitter for communicating position information to a first base station in a mobile communications network, in response to a user interaction with the mobile communication terminal to communicate with a receiving terminal by way of the first base station in a mobile communication network, wherein the position information is communicated independent from any request submitted from the first base station;
such that the first base station calculates a first position for the mobile communication terminal based on the position information communicated by the transmitter, and further the first base station converts the position information transmitted from the mobile communication terminal into a user-identifiable location data, wherein the user-identifiable location data is transmitted from the first base station to the receiving terminal to convey position of the mobile communication terminal to a user of the receiving terminal, and
wherein the position information is not received by the receiving terminal, and
wherein a user of the mobile communication terminal is provided with a choice to transmit a phone number assigned to the mobile communication terminal, or a combination of both a position and the phone number of the mobile communication terminal to a receiving terminal by way of the first base station in a mobile communication network.

7. The mobile communication terminal of claim 6, wherein second identifying information comprising a phone number assigned to the mobile communication terminal is displayed in conjunction with the position of the mobile communication terminal.

8. The mobile communication terminal of claim 7, wherein the second identifying information comprises a text message originated from the mobile communication terminal.

9. The method of claim 1, wherein the position of the mobile communication terminal is displayed on the receiving terminal in advance of voice communication between the mobile communication terminal and the receiving terminal.

10. The method of claim 9, wherein the position information is not updated after commencement of voice communication, unless updated position information for the mobile communication terminal is actively requested by at least one of the user of the mobile communication terminal and a user of the receiving terminal.

* * * * *